US008725153B2

(12) United States Patent
Dimou et al.

(10) Patent No.: US 8,725,153 B2
(45) Date of Patent: May 13, 2014

(54) METHODS AND DEVICES FOR ADJUSTING RESOURCE MANAGEMENT PROCEDURES IN HETEROGENEOUS COMMUNICATION NETWORKS

(75) Inventors: Konstantinos Dimou, San Francisco, CA (US); Yu Yang, Solna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/420,116

(22) Filed: Mar. 14, 2012

(65) Prior Publication Data

US 2013/0210434 A1   Aug. 15, 2013

Related U.S. Application Data

(60) Provisional application No. 61/599,038, filed on Feb. 15, 2012.

(51) Int. Cl.
*H04W 36/00* (2009.01)
*H04W 72/00* (2009.01)
*H04W 4/00* (2009.01)
*H04W 24/00* (2009.01)

(52) U.S. Cl.
USPC ............ 455/436; 455/452.1; 455/452.2; 455/435.2; 455/423; 455/444; 455/450

(58) Field of Classification Search
USPC .......................................... 455/436
See application file for complete search history.

(56) References Cited

U.S. PATENT DOCUMENTS

| 2005/0233752 | A1* | 10/2005 | Laroia et al. | 455/450 |
|---|---|---|---|---|
| 2010/0240367 | A1* | 9/2010 | Lee et al. | 455/435.2 |
| 2011/0021201 | A1 | 1/2011 | Lee et al. | |
| 2011/0028144 | A1 | 2/2011 | Catovic et al. | |
| 2011/0080889 | A1* | 4/2011 | Kanterakis | 370/329 |
| 2011/0163917 | A1* | 7/2011 | Lundgren et al. | 342/463 |
| 2012/0270536 | A1* | 10/2012 | Ratasuk et al. | 455/423 |
| 2013/0017834 | A1* | 1/2013 | Han et al. | 455/437 |
| 2013/0065541 | A1* | 3/2013 | Lum et al. | 455/77 |
| 2013/0084877 | A1* | 4/2013 | Martin et al. | 455/452.1 |

FOREIGN PATENT DOCUMENTS

WO   2011123006 A1   10/2011

OTHER PUBLICATIONS

Zte et al. "Consideration of Cell Type and UE mobility state in MRO" 3GPP TSG RAN WG3 #66bis, R3-100191, 3rd Generation Partnership Project (3GPP), Mobile Competence Centre, vol. RAN WG3, 2010, 4 pages.

(Continued)

*Primary Examiner* — Timothy Pham
(74) *Attorney, Agent, or Firm* — Rothwell, Figg, Ernst & Manbeck, P.C.

(57) ABSTRACT

Devices and methods for adjusting resource management procedures in heterogeneous communication networks are disclosed. In one aspect, a method for adjusting radio resource management procedures in a mobile device communicating with a node operating in a cell in a heterogeneous communication network includes transmitting a first message to the node, the first message including a request for cell information, receiving a second message transmitted from the node, the second message including the requested cell information, measuring signal reception information, processing the received cell information and measured signal reception information to determine an adjustment to a radio resource management procedure, and adjusting the radio resource management procedure based on the determined adjustment. The first and second messages may be radio resource control (RRC) messages, such as RRC connection request and response messages.

25 Claims, 17 Drawing Sheets

(56) References Cited

OTHER PUBLICATIONS

Ericsson, "Analysis and support for enhanced mobility in HetNet deployments" 3GPP TSG-RAN WG3 #74, R3-112989, 3rd Generation Partnership Project (3GPP), Mobile Competence Centre, vol. RAN WG3, 2011, 6 pages.

Notification of Transmittal of the International Search Report and the Written Opinion of the International Searching Authority, or the Declaration, issued on Jun. 3, 2013 in corresponding international application No. PCT/IB2013/051198, 18 pages.

* cited by examiner

| INFORMATION ELEMENTS | |
|---|---|
| Message Type | Connection Request |
| UE Identity | CHOICE |
| | S-TMSI |
| | Random Value |
| Establishment Cause | CHOICE |
| | Emergency |
| | High Priority Access |
| | Mobile Terminating Access |
| | Mobile Originating Signaling |
| | Mobile Originating Data |
| Cell Characteristics Info | CHOICE |
| | Cell Size |
| | Cell Type |
| | System Load |
| | Node Information |

FIG. 10

METHODS AND DEVICES FOR ADJUSTING RESOURCE MANAGEMENT PROCEDURES IN HETEROGENEOUS COMMUNICATION NETWORKS

CROSS-REFERENCE TO RELATED APPLICATIONS

The present application claims priority benefit under 35 U.S.C. §119(e) of U.S. Provisional Patent Application No. 61/599,038, entitled "Enhanced Radio Resource Management in HetNets," filed Feb. 15, 2012, the contents of which are incorporated herein by reference in their entirety.

TECHNICAL FIELD

The present invention relates generally to heterogeneous communication networks, and more particularly, to methods and devices for adjusting resource management procedures in heterogeneous communication networks.

BACKGROUND

Currently, the deployment of heterogeneous networks (HetNets) is viewed as one of the most cost efficient deployment strategies for wireless communication systems in addressing the growing traffic demands and the expectation for higher data rates. Typical cellular networks today are characterized by non-uniform user and traffic distributions. HetNets complement the macro networks with low power nodes (LPN), such as micro, pico, and femto base stations or relay nodes, which can achieve significantly improved capacity and high data rates.

In wireless communication systems with a heterogeneous network deployment, mobility management is a challenging task. Investigations have been undertaken to evaluate performance of hard handover in orthogonal frequency-division multiplexing (OFDM) based cellular systems, such as 3GPP Long-Term Evolution (LTE) or IEEE 802. System level simulation results have been extensively discussed within standardization, such as 3GPP. Simulation results from these studies show that the careful choice of handover triggers (i.e., Time-to-Trigger and signal hysteresis) for cells of different sizes can lead to substantial reduction in handover failure rate, as well as system and service performance improvements.

In wireless communication systems with a heterogeneous network deployment, it is important to choose the optimal mobility trigger to use when a mobile device or other user equipment (UE) is operating in different types of cells, e.g. different mobility triggers should be used when the UE is operating in a macro cell, as compared with when the UE is operating in a femto cell. Failure to use the optimal mobility trigger in such systems can be more severe than in normal networks featuring uniform deployment of cells. For example, with a large Time-to-Trigger in a macro cell, the handover might be delayed, which means that the communication with the serving base station is very likely experiencing higher loss rate and, thus, a higher probability of radio link failure. In addition, this communication interferes with the micro, pico or femto base station eNodeB (eNB) or low power node (LPN) in uplink, and in downlink, UEs served by LPNs and located close to small cell's borders are heavily interfered with by the transmissions to the UE still connected to the macro base station (eNB). These interference effects are more pronounced and more troublesome for an operator in a wireless communication system with a heterogeneous network deployment, than in a homogeneous network.

Currently, the cell selection and handover functionality in LTE is controlled by the network. While the UE provides measurements to the network (i.e., eNB), the UE is unable to influence or respond dynamically to perform optimized handover decisions. The handover triggers, as well as additional mobility related parameters, such as Layer 3 filtering coefficients and measurement bandwidth, are configured by the eNB and transmitted to the UE via measurement control messages. The UE uses the configured parameters to evaluate the configured events, e.g., the cell reselection is implicitly controlled by the network.

One drawback for this conventional method is that the measurement report from the UE is a L3 filtered value of reference signal received power (RSRP)/reference signal received quality (RSRQ), which does not represent the current real-time link quality as a result of filtering and because there is a time delay between when the UE measures RSRP/RSRQ and when the measurements are available at the serving eNB. This time delay can range from few msecs up to hundreds of msecs. Moreover, the UE, once it has reported RSRP/RRSQ to the network, has to wait during a given time period before the UE can report updated RSRP/RSRQ values to the network. This time period is on the order of a few hundreds of msecs.

In wireless communication systems with a heterogeneous network deployment, more up-to-date real-time measurements, which can reflect the current radio link quality, are needed in order to optimize the handover procedure. One reason for this is that smaller cell size involves more dynamic signal strength changes. It is not a viable solution for the eNB to obtain real-time measurements from the UE since this would result in consuming a significantly high amount of UE resources. Further, as discussed above, the cell selection and handover functionality in LTE is controlled by the network, and although the UE provides measurements to the network (i.e., eNB), the UE is unable to influence or respond dynamically to perform optimized handover decisions.

Considering cell size as part of adapting mobility related parameters leads to mobility performance improvements. More specifically, it has been discussed within 3GPP that different mobility triggers should be used when the UE is located in a large cell, as compared with when the UE is located in a small cell. The UE, however, even with these different mobility triggers, is unable to determine which sets of triggers to use since the UE is not aware of the cell size within its current cell, unless instructed by the network. It is noted that, in 3GPP TS 36.423, the Cell Type IE, which contains the information of cell size (very small, small, medium, large), is included in the Last Visited Cell IE in the UE History Information IE, and is included in the Source eNB to Target eNB Transparent Container IE in the Handover Request message over S1. However, this information (i.e., cell type/cell size) is only exchanged among the networks, and the UE does not have any information on cell type and cell size.

Accordingly, there is a need for a method and device for adjusting radio resource management procedures in wireless communication systems with a heterogeneous network deployment that can improve system and service performance by optimizing handover procedures, decreasing the handover failure rate, and by improving radio resource management such as uplink power control, radio link failure and link adaptation.

SUMMARY

Particular embodiments of the present invention are directed to devices and methods for adjusting resource management procedures in heterogeneous communication networks.

In one particular aspect, a method for adjusting resource management procedures in a mobile device communicating with a node operating in a cell in a heterogeneous communication network includes transmitting a first message to the node. The first message includes a request for cell information. The method further includes receiving a second message transmitted from the node. The second message includes the requested cell information. The method further includes measuring signal reception information, processing the received cell information and measured signal reception information to determine an adjustment to a resource management procedure, and adjusting the resource management procedure based on the determined adjustment.

According to particular embodiments of the present invention, the first message and the second message are radio resource control (RRC) messages. In some embodiments, the first message is a radio resource control (RRC) connection request message and the second message is a radio resource control (RRC) connection response message.

In some embodiments, the cell information includes information relating to one or more of cell size, cell type, system load, node information, maximum transmit power, maximum base station users, number of antennas and antenna gain, and the signal reception information includes information relating to one or more of reference signal received power (RSRP), reference signal received quality (RSRQ), channel quality indicator (CQI), channel state information (CSI), and signal to interference plus noise ratio (SINR). More generally, however, the cell information may include or represent any appropriate information relating to the characteristics or configuration of the relevant cell and/or a base station serving the cell. Furthermore, the signal reception information may, more generally, include or represent any appropriate information relating to signal strength, channel quality, or other properties of the signals received by the mobile device or the channel over which the mobile device receives such signals.

In some embodiments, adjusting the radio resource management procedure includes adjusting one or more of handover, uplink (UL) power control, radio link failure (RLF) recovery and link adaptation. Additionally, in embodiments in which the handover procedure is adjusted, the adjustment may include, for example, setting the size of the measurement report, setting the value of measurement gap, determining a Time-to-Trigger value, or determining a signal hysteresis value. In embodiments in which RLF recovery procedures are adjusted, the adjustment may include, for example, determining a particular cell with respect to which the mobile device will perform the RLF recovery. In embodiments in which link adaptation procedures are adjusted, the adjustment may include, for example, adjusting a frequency with which reference signals (such as Sounding Reference Symbols (SRSs)) or channel information (such as Channel Quality Information (CQI)) are communicated between the mobile device and network, or adjusting a modulation and/or coding scheme configuration for the mobile device. In embodiments in which power control is adjusted, the adjustment may include, for example, setting a specific transmission power used by the mobile device or changing the procedure for setting the transmission power (e.g., by changing a size of the incremental power control steps applied by the mobile device when determining an appropriate transmission power).

In some embodiments, the method further includes measuring a value relating to a radio channel quality for transmitting to the node and transmitting the first message to the node only when the measured value is greater than a predetermined threshold value.

Particular embodiments provide a mobile device operable in a heterogeneous communication network to transmit messages to and receive messages from a node operating in a cell. According to certain embodiments of the present invention, the mobile device includes a processor, a memory coupled to the processor, a transceiver coupled to the processor, and an antenna coupled to the transceiver configured to transmit and receive messages. In some embodiments, the processor is configured to transmit a first message to the node. The first message includes a request for cell information. The mobile device may be configured to receive a second message transmitted from the node. The second message includes the requested cell information. The mobile device may be configured to measure signal reception information, process the received cell information and measured signal reception information to determine an adjustment to a resource management procedure, and adjust the resource management procedure based on the determined adjustment.

According to particular embodiments of the present invention, the first message and the second message are radio resource control (RRC) messages. In some embodiments, the first message is a radio resource control (RRC) connection request message and the second message is a radio resource control (RRC) connection response message.

In some embodiments, the cell information includes information relating to one or more of cell size, cell type, system load, node information, maximum transmit power, maximum base station users, number of antennas and antenna gain, and the signal reception information includes information relating to one or more of reference signal received power (RSRP), reference signal received quality (RSRQ), channel quality indicator (CQI), channel state information (CSI), and signal to interference plus noise ratio (SINR).

In some embodiments, adjusting the radio resource management procedure includes adjusting one or more of handover, uplink (UL) power control, radio link failure (RLF) recovery and link adaptation, and may include any of the example adjustments described above and/or other suitable adjustments.

In some embodiments, the processor may be further configured to measure a value relating to a radio channel quality for transmitting to the node and to transmit the first message to the node only when the measured value is greater than a predetermined threshold value.

In another particular aspect, a method for adjusting resource management procedures in a mobile device communicating with a node operating in a cell in a heterogeneous communication network includes receiving a first message from the mobile device. The first message includes a request for cell information. The method further includes measuring a value relating to received signal strength and transmitting a second message to the mobile device only when the measured value is greater than a predetermined threshold value. The second message includes the requested cell information.

According to particular embodiments of the present invention, the first message and the second message are radio resource control (RRC) messages. In some embodiments, the first message is a radio resource control (RRC) connection request message and the second message is a radio resource control (RRC) connection response message.

In some embodiments, the cell information includes information relating to one or more of cell size, cell type, system load, node information, maximum transmit power, maximum base station users, number of antennas and antenna gain.

Particular embodiments provide a node operable in a heterogeneous communication network to transmit messages to and receive messages from a mobile device operating in a cell. According to particular embodiments of the present invention, the node includes a processor, a memory coupled to the processor, a network interface coupled to the processor, a transceiver coupled to the network interface, and an antenna coupled to the transceiver configured to transmit and receive messages. The processor may be configured to receive a first message from the mobile device. The first message includes a request for cell information. The processor may be configured to measure a value relating to received signal strength and to transmit a second message to the mobile device only when the measured value is greater than a predetermined threshold value. The second message includes the requested cell information.

In some embodiments, the first message and the second message are radio resource control (RRC) messages. In some embodiments, the first message is a radio resource control (RRC) connection request message and the second message is a radio resource control (RRC) connection response message.

In some embodiments, the cell information includes information relating to one or more of cell size, cell type, system load, node information, maximum transmit power, maximum base station users, number of antennas and antenna gain.

In one particular aspect, a method for adjusting resource management procedures in a mobile device communicating with a node operating in a cell in a heterogeneous communication network includes receiving a message transmitted from the node. The message includes cell information. The method further includes measuring signal reception information, processing the received cell information and measured signal reception information to determine an adjustment to a resource management procedure, and adjusting the resource management procedure based on the determined adjustment.

According to particular embodiments of the present invention, the message is a radio resource control (RRC) measurement control message.

In some embodiments, the cell information includes information relating to one or more of cell size, cell type, system load, node information, maximum transmit power, maximum base station users, number of antennas and antenna gain, and the signal reception information includes information relating to one or more of reference signal received power (RSRP), reference signal received quality (RSRQ), channel quality indicator (CQI), channel state information (CSI), and signal to interference plus noise ratio (SINR).

In some embodiments, adjusting the radio resource management procedure includes adjusting one or more of handover, uplink (UL) power control, radio link failure (RLF) recovery and link adaptation, and may include any of the example adjustments described above and/or other suitable adjustments.

Particular embodiments provide a mobile device operable in a heterogeneous communication network to transmit messages to and receive messages from a node operating in a cell. According to certain embodiments of the present invention, the node includes a processor, a memory coupled to the processor, a transceiver coupled to the processor, and an antenna coupled to the transceiver configured to transmit and receive messages. The processor may be configured to receive a message transmitted from the node. The message includes cell information. The processor may be configured to measure signal reception information, process the received cell information and measured signal reception information to determine an adjustment to a resource management procedure, and adjust the resource management procedure based on the determined adjustment.

According to particular embodiments of the present invention, the message is a radio resource control (RRC) measurement control message. In some embodiments, the cell information includes information relating to one or more of cell size, cell type, system load, node information, maximum transmit power, maximum base station users, number of antennas and antenna gain, and the signal reception information includes information relating to one or more of reference signal received power (RSRP), reference signal received quality (RSRQ), channel quality indicator (CQI), channel state information (CSI), and signal to interference plus noise ratio (SINR).

In some embodiments, adjusting the radio resource management procedure includes adjusting one or more of handover, uplink (UL) power control, radio link failure (RLF) recovery and link adaptation, and may include any of the example adjustments described above and/or other suitable adjustments.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

FIG. 10 is a diagram of information elements of a radio resource control (RRC) connection request message for use in a method for adjusting radio resource management procedures in a mobile device operating in a heterogeneous communication network, in accordance with exemplary embodiments of the present invention.

DETAILED DESCRIPTION

In exemplary embodiments of the disclosed methods and devices, a method for adjusting radio resource management procedures in a mobile device communicating with a node operating in a cell in a heterogeneous communication network is described. In the methods and devices described herein, radio resource management procedures in a mobile device are adjusted to, for example, optimize handover and improve uplink power control, radio link failure and link adaptation, based on cell information received from the node and signal reception information measured by the mobile device. This combined information, which includes, for example, information on cell size and cell type received from the node, and real-time RSRP and RSRQ values measured by the mobile device, enables the mobile device to adjust one or more aspects of the radio resource management procedures utilized by the mobile device. For example, the mobile device may set the size of a measurement report, set the value of measurement gap, determine a Time-to-Trigger value and determine a signal hysteresis value, to optimize handover or adjust aspects of its uplink power control, radio link failure and link adaptation, as described in further detail below.

Figure 1:
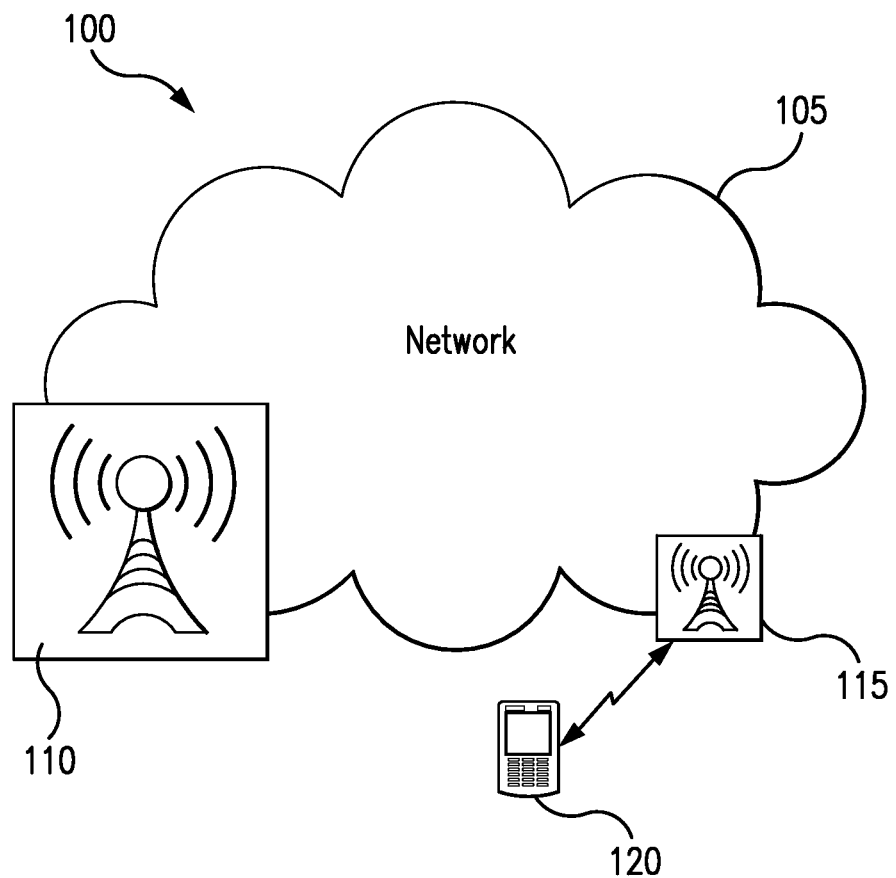
FIG. 1 illustrates an architecture of a wireless communication system with a heterogeneous network deployment, in accordance with exemplary embodiments of the present invention.

Referring now to FIG. 1, an architecture of a wireless communication system 100 with a heterogeneous network deployment, in accordance with exemplary embodiments of the present invention, is illustrated. As shown, wireless communication system 100 includes a wireless network 105, nodes 110 and 115, and mobile devices 120. Examples of node 110 include base stations and relay nodes, such as, for example, serving eNodeB (eNB), high power, and macrocell base stations and relay nodes. Examples of node 115 include base stations and relay nodes, such as, for example, low power, micro, pico, and femto base stations and relay nodes. Examples of mobile devices 120 include wireless User Equipment (UE) and communication devices, such as, for example, mobile telephones, personal digital assistants, electronic readers, portable electronic tablets, personal computers, and laptop computers.

Figure 2:
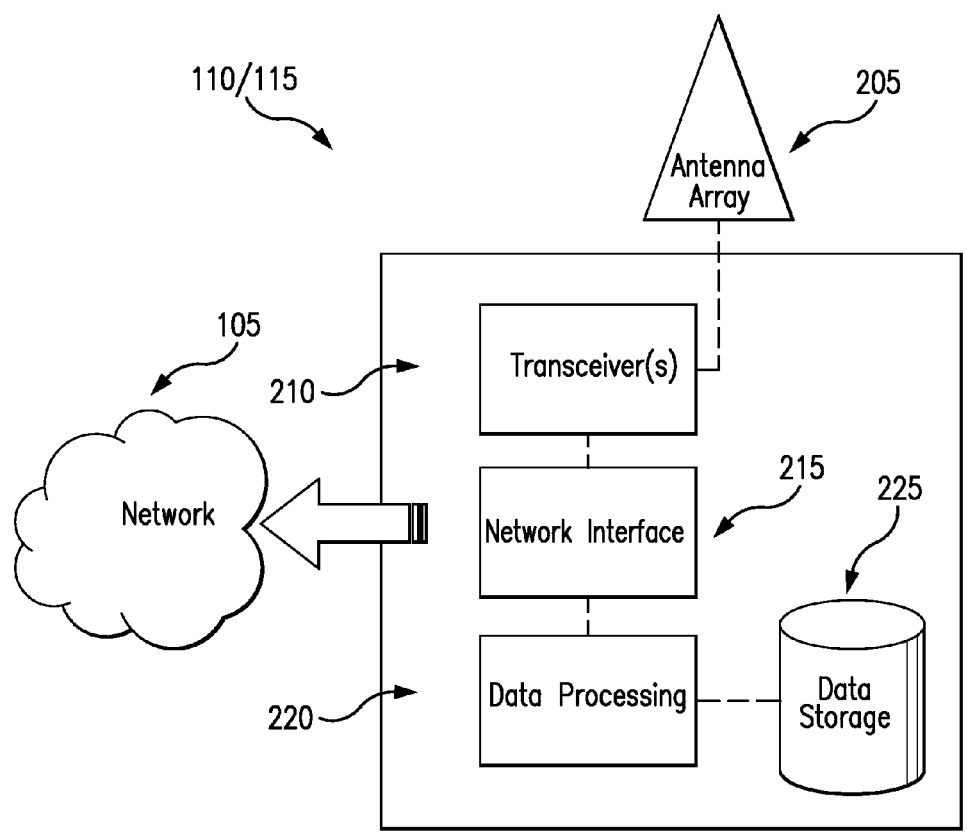
FIG. 2 is a block diagram of a node, as used in the system of FIG. 1 in accordance with exemplary embodiments of the present invention.

Referring now to FIG. 2, a block diagram of nodes 110 and 115, as used in the system of FIG. 1 in accordance with exemplary embodiments of the present invention, is illustrated. As shown in FIG. 2, node 110 and 115 may include: a data processing system 220, which may include one or more microprocessors and/or one or more circuits, such as an application specific integrated circuit (ASIC), Field-programmable gate arrays (FPGAs), and the like; network interface 215; and a data storage system 225, which may include one or more non-volatile storage devices and/or one or more volatile storage devices (e.g., random access memory (RAM)). The network interface 215 is connected to transceiver 210, which is configured to transmit and receive signals via an antenna array 205. In embodiments where data processing system 220 includes a microprocessor, computer readable program code may be stored in a computer readable medium, such as, but not limited, to magnetic media (e.g., a hard disk), optical media (e.g., a DVD), memory devices (e.g., random access memory), and the like. In some embodiments, computer readable program code is configured such that, when executed by a processor, the code causes the data processing system 220 to perform steps described below (e.g., steps described below with reference to the flow charts shown in FIGS. 8, 13 and 16). In other embodiments, the nodes 110 and 115 are configured to perform steps described above without the need for code. That is, for example, data processing system 220 may consist merely of one or more ASICs. Hence, the features of the present invention described above may be implemented in hardware and/or software. For example, in particular embodiments, the functional components of the nodes 110 and 115 described above may be implemented by data processing system 220 executing computer instructions, by data processing system 220 operating independent of any computer instructions, or by any suitable combination of hardware and/or software.

Figure 3:
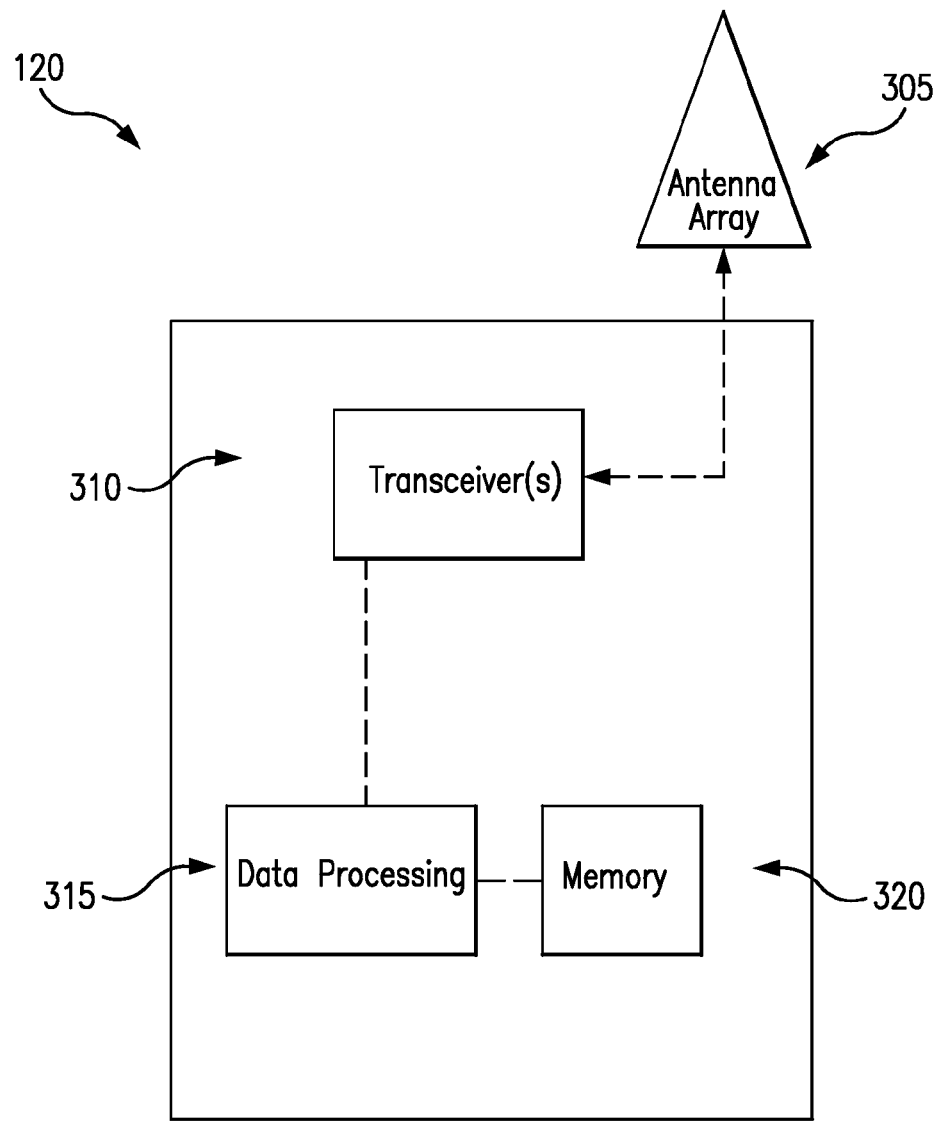
FIG. 3 is a block diagram of a mobile device, as used in the system of FIG. 1 in accordance with exemplary embodiments of the present invention.

Referring now to FIG. 3, a block diagram of a mobile device, as used in the system of FIG. 1 in accordance with exemplary embodiments of the present invention, is illustrated. As shown in FIG. 3, mobile device 120 may include: a data processing system 315, which may include one or more microprocessors and/or one or more circuits, such as an application specific integrated circuit (ASIC), field-programmable gate arrays (FPGAs), and the like; a transceiver 310 for transmitting data to (and receiving data from) nodes 110 and 115 via antenna array 305; and a memory 320, which may include one or more non-volatile storage devices and/or one or more volatile storage devices (e.g., random access memory (RAM)). In embodiments where data processing system 315 includes a microprocessor, computer readable program code may be stored in a computer readable medium, such as, but not limited to, magnetic media (e.g., a hard disk), optical media (e.g., a DVD), memory devices (e.g., random access memory), and the like. In some embodiments, computer readable program code is configured such that when executed by a processor, the code causes mobile device 120 to perform steps described below (e.g., steps described below with reference to the flow charts shown in FIGS. 7, 12 and 17). In other embodiments, mobile device 120 is configured to perform steps described above without the need for code. That is, for example, data processing system 315 may consist merely of one or more ASICs. Hence, the features of the present invention described above may be implemented in hardware and/or software. For example, in particular embodiments, the functional components of mobile device 120 described above may be implemented by data processing system 315 executing computer instructions, by data processing system 315 operating independent of any computer instructions, or by any suitable combination of hardware and/or software.

Figure 4:
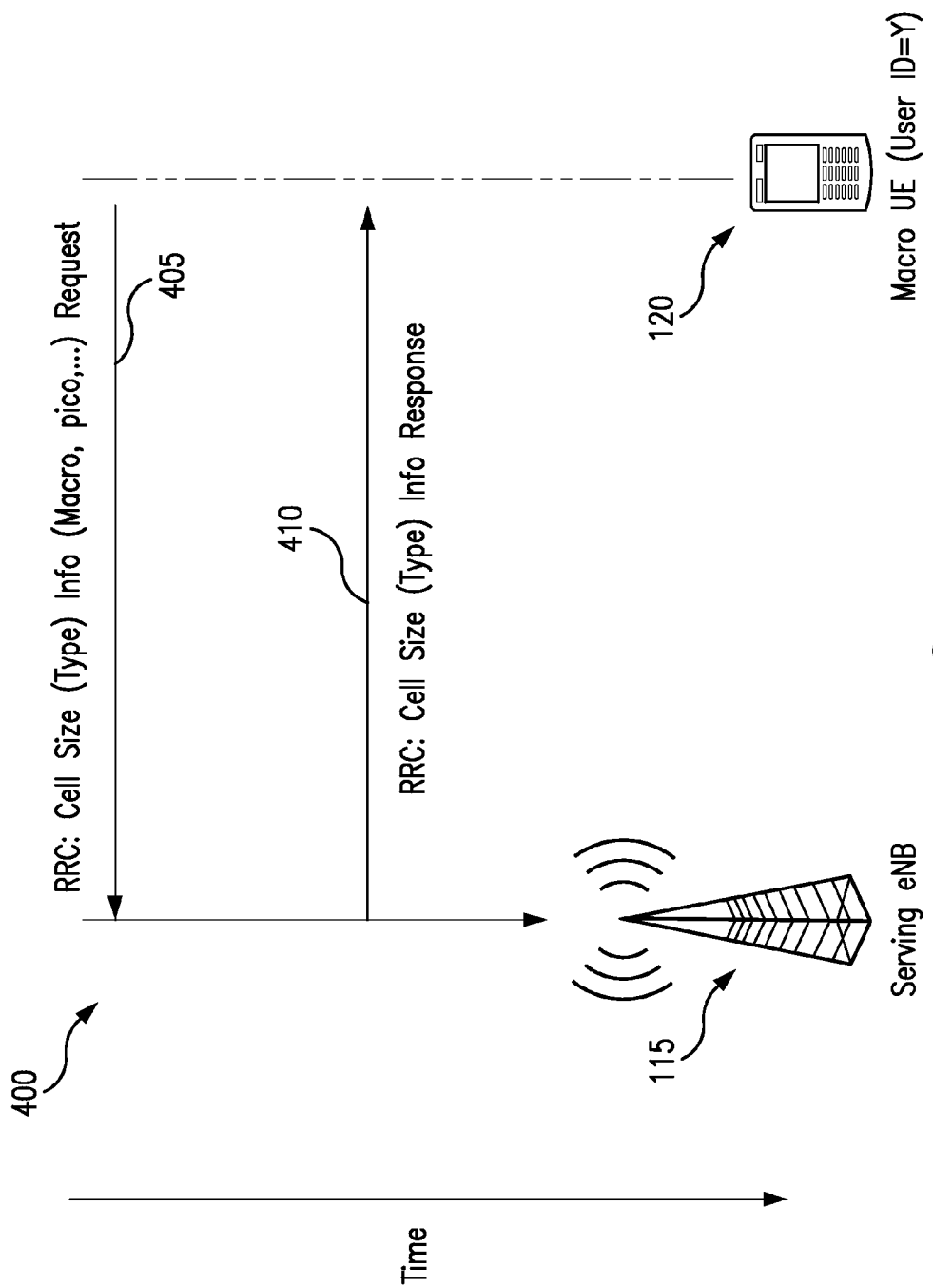
FIG. 4 is a time sequence diagram illustrating a first exemplary messaging flow for a method for adjusting radio resource management procedures in a mobile device operating in a heterogeneous communication network, in accordance with exemplary embodiments of the present invention.

Referring now to FIG. 4, a time sequence diagram 400 illustrating a first exemplary messaging flow for a method for adjusting radio resource management procedures in a mobile device operating in a heterogeneous communication network, in accordance with exemplary embodiments of the present invention, is shown. In one embodiment, UE mobile device 120 and serving eNB 115 send and receive radio resource control (RRC) messages 405, 410 to enable the UE mobile device 120 to obtain cell information, including, for example, information relating to one or more of cell size, cell type, system load, node information, maximum transmit power, maximum base station users, number of antennas and antenna gain, from the serving eNB 115. Examples of the different types of cell size and cell type information that may be requested and provided includes cell sizes and types enumerated, for example, in 3GPP2 TS 36.331 and 36.133, and may include very small, small, medium, large, very large, macro, large macro, very large macro, micro, pico and femto cell types and cell sizes. This cell information is then utilized by the UE mobile device 120, along with signal reception information, including, for example, information relating to one or more of reference signal received power (RSRP), reference signal received quality (RSRQ), channel quality indicator (CQI), channel state information (CSI) and signal to interference plus noise ratio (SINR), to determine whether to adjust radio resource management procedures. For example, in particular embodiments, the mobile device may adjust a handover process utilized by the mobile device based on the cell information and the signal reception information. In various embodiments, the adjustment may include, for example, setting the size of a measurement report, setting the value of measurement gap, determining a Time-to-Trigger value, and determining a signal hysteresis value, in the UE mobile device 120 by, for example, adjusting one or more of handover, uplink (UL) power control, radio link failure (RLF) recovery and link adaptation. Reference signal received power (RSRP) and reference signal received quality (RSRQ) are described, for example, in 3GPP TS 36.321, and channel quality indicator (CQI) and channel state information (CSI) are described, for example, in 3GPP TS 36.133.

Figure 5:
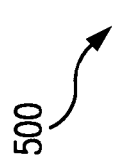
FIG. 5 is a diagram of information elements of a radio resource control (RRC) cell information request message for use in a method for adjusting radio resource management procedures in a mobile device operating in a heterogeneous communication network, in accordance with exemplary embodiments of the present invention.

FIG. 5 is a diagram of a radio resource control (RRC) cell information request message for use in a method for adjusting radio resource management procedures in a mobile device operating in a heterogeneous communication network, in accordance with exemplary embodiments of the present invention. The diagram 500 illustrates the information elements that may be included in the radio resource control (RRC) cell information request message 405 sent from the UE mobile device 120 to the serving eNB 115, as shown in the time sequence diagram 400 illustrated in FIG. 4.

Figure 6:
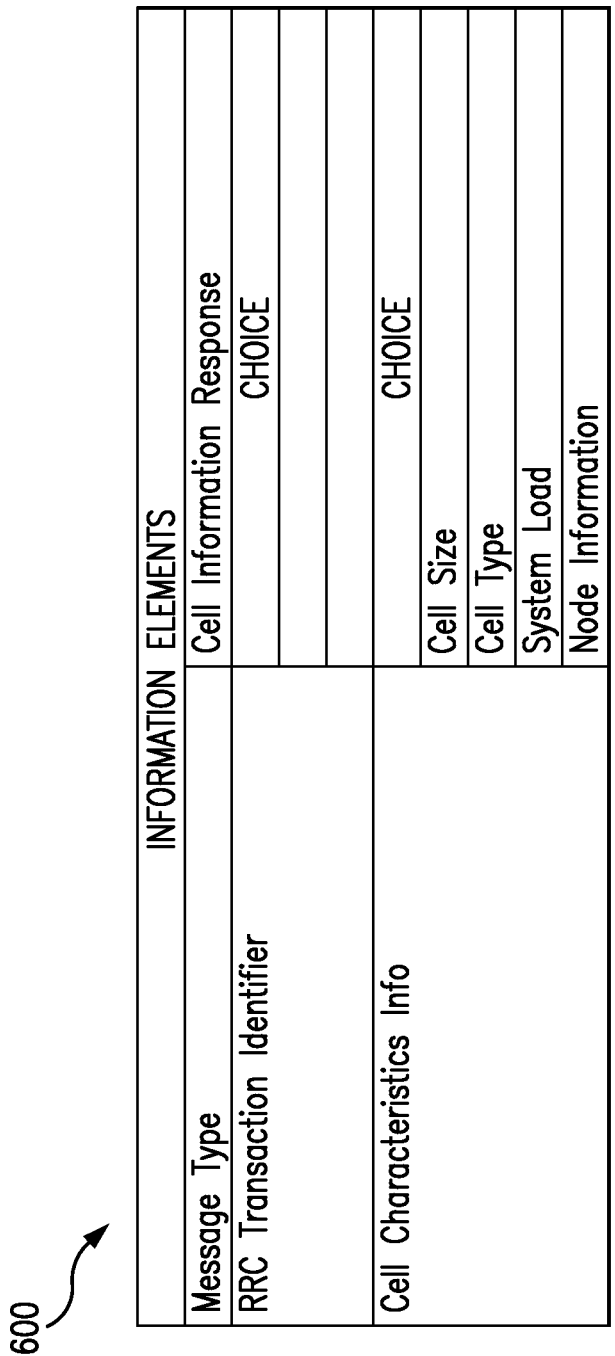
FIG. 6 is a diagram of information elements of a radio resource control (RRC) cell information response message for use in a method for adjusting radio resource management procedures in a mobile device operating in a heterogeneous communication network, in accordance with exemplary embodiments of the present invention.

FIG. 6 is a diagram of a radio resource control (RRC) cell information response message for use in a method for adjusting radio resource management procedures in a mobile device operating in a heterogeneous communication network, in accordance with exemplary embodiments of the present invention. The diagram 600 illustrates the information elements that may be included in the radio resource control (RRC) cell information response message 410 sent from the serving eNB 115 to the UE mobile device 120, as shown in the time sequence diagram 400 illustrated in FIG. 4.

Figure 7:
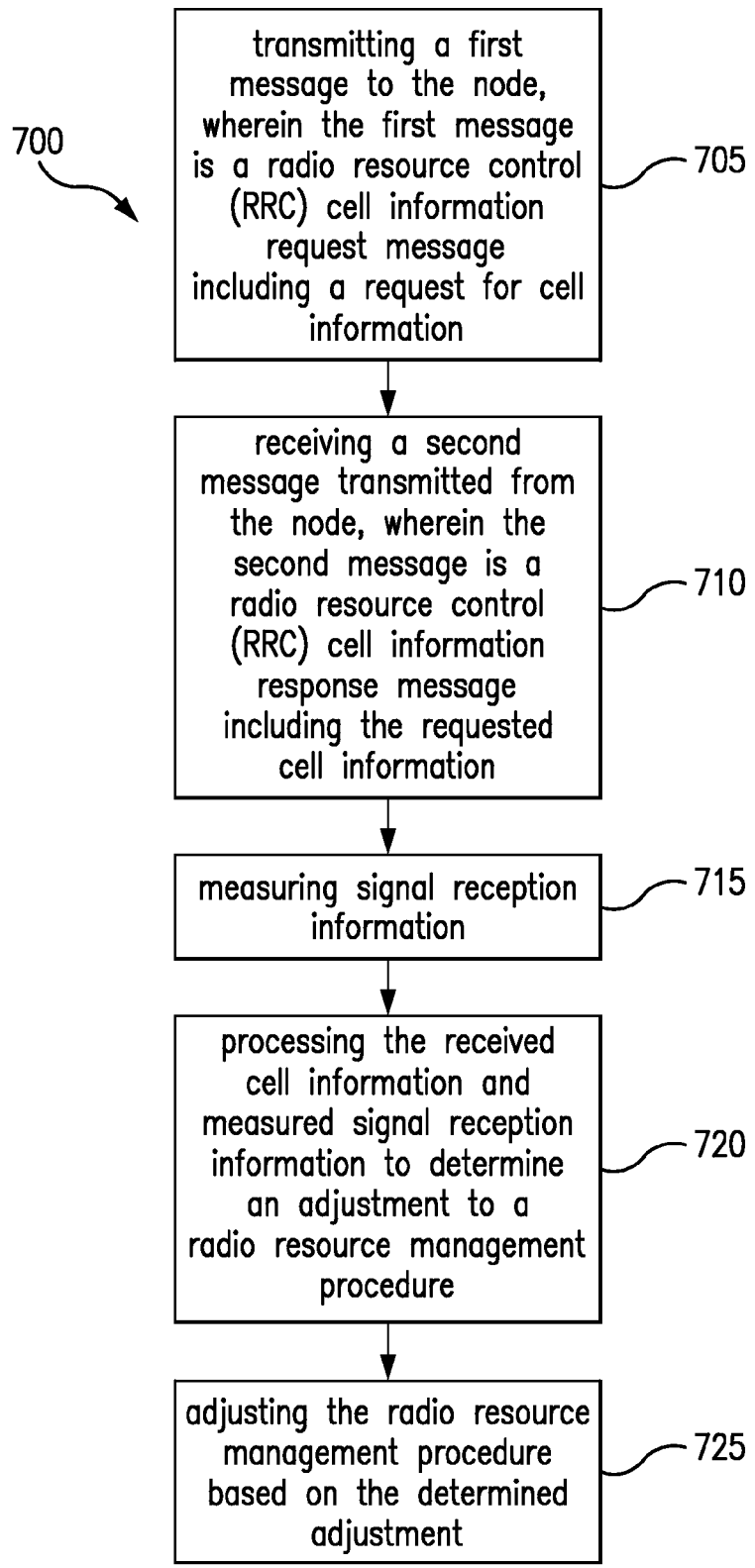
FIG. 7 is a flow chart illustrating the steps performed by a mobile device in a method for adjusting radio resource management procedures in a mobile device operating in a heterogeneous communication network using radio resource control (RRC) cell information request and response messages, in accordance with exemplary embodiments of the present invention.
Figure 8:
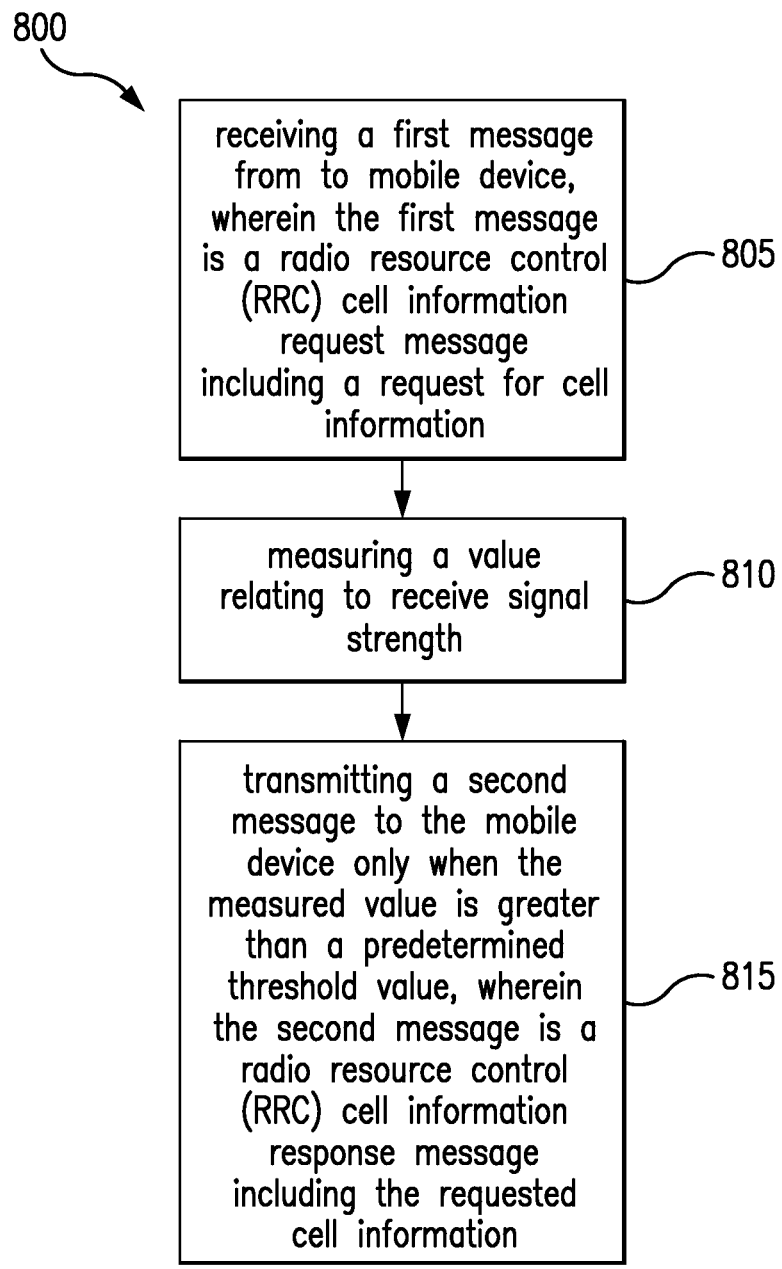
FIG. 8 is a flow chart illustrating the steps performed by a node in a method for adjusting radio resource management procedures in a mobile device operating in a heterogeneous communication network using radio resource control (RRC) cell information request and response messages, in accordance with exemplary embodiments of the present invention.

Referring now to FIGS. 7 and 8, flow charts illustrating a method for adjusting radio resource management procedures in a mobile device operating in a heterogeneous communication network using radio resource control (RRC) cell information request and response messages, in accordance with exemplary embodiments of the present invention, are provided. In the flow chart of FIG. 7, the steps are being performed by the UE mobile device 120. In the flow chart of FIG. 8, the steps are being performed by the serving eNB 115.

Referring first to FIG. 7, in the first step 705, the UE mobile device 120 transmits a first message to the serving eNB 115. The first message may be a radio resource control (RRC) cell information request message including a request for cell information. As described above, the cell information requested from the serving eNB 115 may include, for example, information relating to one or more of cell size, cell type, system load, node information, maximum transmit power, maximum base station users, number of antennas and antenna gain.

Referring now to FIG. 8, in the first step 805, the serving eNB 115 receives the first message from the UE mobile device 120 requesting the cell information. In step 810, the serving eNB 115 measures a value relating to received signal strength, and then, in step 815, transmits a second message to the UE mobile device 120 only when the measured value is greater than a predetermined threshold value. The second message may be a radio resource control (RRC) cell information response message that includes the requested cell information.

Referring now back to FIG. 7, in step 710, the UE mobile device 120 receives the second message transmitted from the serving eNB 115, which includes the requested cell information. In step 715, the UE mobile device 120 measures signal reception information. As discussed above, the signal reception information may include information relating to one or more of reference signal received power (RSRP), reference signal received quality (RSRQ), channel quality indicator (CQI), channel state information (CSI), and signal to interference plus noise ratio (SINR). In step 720, the UE mobile device 120 processes the received cell information and measured signal reception information to determine an adjustment to a radio resource management procedure, and in step 725, the UE mobile device 120 adjusts the radio resource management procedure based on the determined adjustment. As described above, adjusting the radio resource management procedure may include adjusting one or more of handover, uplink (UL) power control, radio link failure (RLF) recovery and link adaptation. In particular embodiments that adjust the handover procedure, the adjustment may include, for example, one or more of setting the size of the measurement report, setting the value of measurement gap, determining a Time-to-Trigger value, and determining a signal hysteresis value.

As described above, the UE mobile device 120 transmits a first message to the serving eNB 115. There are a number of different triggering events, for example, that may trigger the UE mobile device 120 to transmit the first message, including when the UE mobile device 120 enters a new cell, when the state of the UE mobile device 120 changes to connected mode from idle mode, when the UE mobile device 120 detects that it is not operating in a normal (i.e., macro) cell, when reference signal received power (RSRP) is above a threshold value (e.g., −80 dBm), and when the state of the UE mobile device 120 changes from DTX or DRX sleep mode to active mode.

As also described above, the UE mobile device 120 processes the received cell information and measured signal reception information to determine an adjustment to a radio resource management procedure. As also indicated above, adjusting the radio resource management procedures may include setting the size of a measurement report, setting the value of measurement gap, determining a Time-to-Trigger value and determining a signal hysteresis value. In another exemplary embodiment, the cell information received from the serving eNB 115 includes the cell size and the signal reception information measured by the UE mobile device 120 includes reference signal received power (RSRP) and signal to interference plus noise ratio (SINR). The UE mobile device 120, in processing the received cell information and measured signal reception information, determines if the cell size is large and if the RSRP/SINR variation is large. If the cell size is not large, then the size of the measurement report is set to large, and the Time-to-Trigger and signal hysteresis values are set to slow. If the RSRP/SINR variation is not large, then the size of the measurement report is set to large, and the Time-to-Trigger and signal hysteresis values are set to slow. If the cell size is large and the RSRP/SINR variation is large, then the size of the measurement report is set to small, and the Time-to-Trigger and signal hysteresis values are set to fast; By determining whether an adjustment to the radio resource management procedure is necessary and making the adjustments to the measurement report size, Time-to-Trigger value and signal hysteresis value, the handover failure rate is reduced.

In another exemplary embodiment, the received cell information includes information relating to cell size and system load, the radio resource management procedure includes setting the size of a measurement report for transmission to the node, and, based on the cell size and system load, the size of the measurement report is adjusted to a standard size or a minimum size.

In yet another exemplary embodiment, the mobile device adjusts an RLF recovery procedure utilized by the mobile device based on the cell information and the signal reception information. As one example, the mobile device may use information on cell size, and possibly other suitable considerations (e.g., knowledge of its own speed), in selecting a cell in which to perform RLF recovery. For example, when choosing a cell in which to perform RLF recovery, a slow-moving mobile device may select a smaller cell for RLF recovery over a bigger cell from which the mobile device is receiving a signal of equal or comparable signal strength. Likewise, a fast-moving mobile device may select a bigger cell for RLF recovery over a smaller cell from which the mobile device is receiving a signal of equal or comparable signal strength.

In yet another exemplary embodiment, the mobile device adjusts a link adaptation procedure utilized by the mobile device based on the cell information and the signal reception information. As one example, the mobile device may use information on cell size, and possibly other suitable considerations (e.g., knowledge of its own speed), to determine how often reference signals, channel state information, or other information associated with link adaptation should be communicated. For instance, a mobile device may transmit sounding reference symbols or channel status information (such as Channel Quality Indicators (CQI)) less frequently when operating in a small cell than the relevant mobile device would if operating in a large cell. This may result in lower signaling overhead in the cell and reduced power consumption for the mobile device. As another example, a mobile device may also use cell size to adjust its process for choosing a modulation and coding scheme (MCS). For instance, if a mobile device determines it is operating in small cell, the mobile device may select more aggressive MCS settings based on an assumption that the mobile device is not power limited when operating in a small cell. As a result, the mobile device may be able to achieve greater data throughput by virtue of the more aggressive MCS settings.

In yet another exemplary embodiment, the mobile device adjusts a power control procedure utilized by the mobile device based on the cell information and the signal reception information. As one example, the mobile device may use information on cell size to determine a specific transmission power to use. For instance, if a mobile device determines it is operating in a small cell, it may increase its transmission power based on the assumption that the mobile device is not power limited when operating in a small cell. As another example, the mobile device may adjust its procedure for determining an appropriate transmission power level based on the cell information and signal reception information. For instance, the mobile device may, in response to power control commands from the network, increase its transmission power by larger steps sizes than it would in response to receiving the same commands when operating in a large cell (based again on the assumption that the mobile device is not power-limited when operating in a small cell). Because the mobile device can correctly determine it may utilize higher transmission power levels in these scenarios, it may be able to achieve more robust data transmissions and/or greater data throughput.

Figure 9:
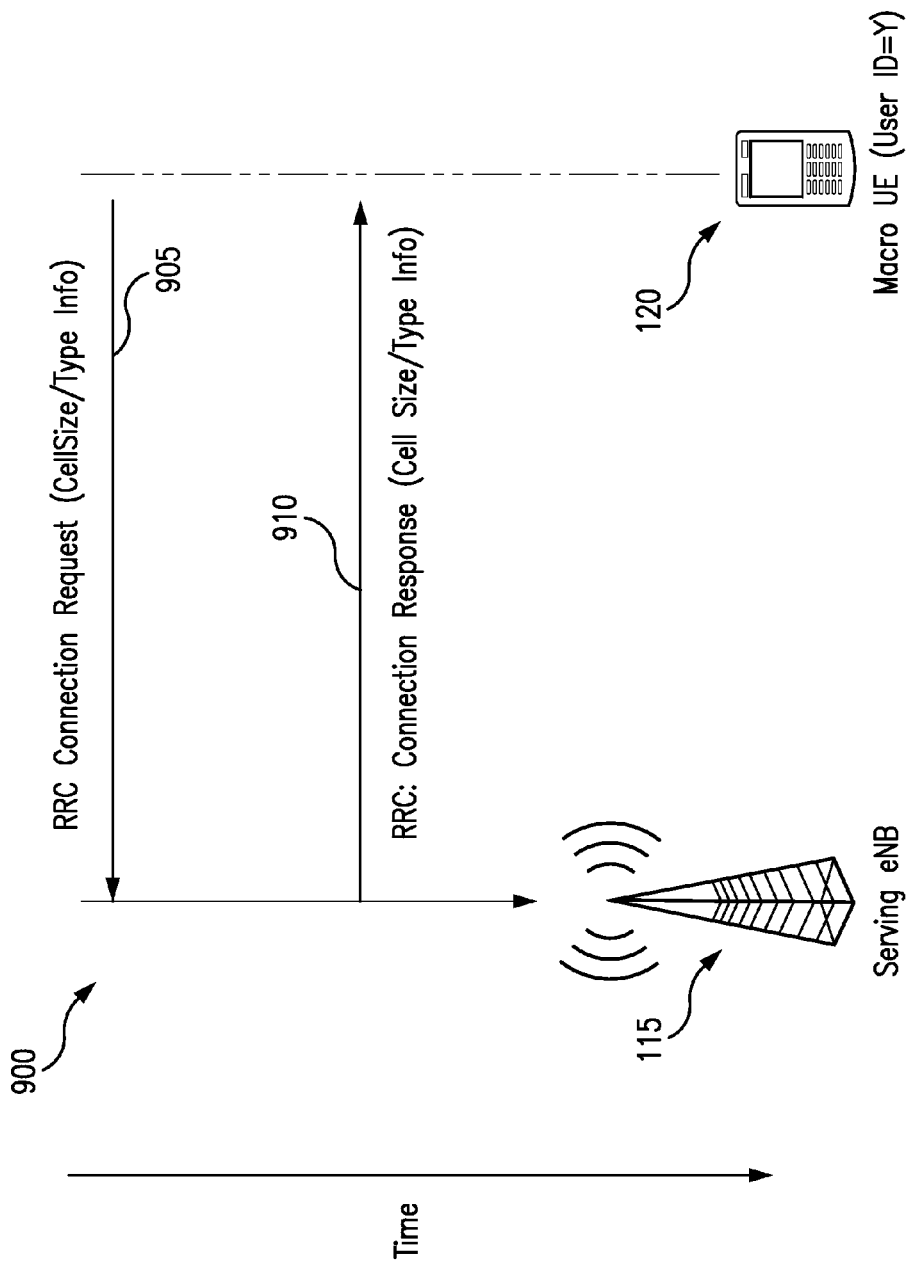
FIG. 9 is a time sequence diagram illustrating a second exemplary messaging flow for a method for adjusting radio resource management procedures in a mobile device operating in a heterogeneous communication network, in accordance with exemplary embodiments of the present invention.

Referring now to FIG. 9, a time sequence diagram 900 illustrating a second exemplary messaging flow for a method for adjusting radio resource management procedures in a mobile device operating in a heterogeneous communication network, in accordance with exemplary embodiments of the present invention, is shown. In one embodiment, UE mobile device 120 and serving eNB 115 send and receive radio resource control (RRC) messages 905, 910 to enable the UE mobile device 120 to obtain cell information, including, for example, information relating to one or more of cell size, cell type, system load, node information, maximum transmit power, maximum base station users, number of antennas and antenna gain, from the serving eNB 115. This cell information is then utilized by the UE mobile device 120, along with signal reception information, including, for example, information relating to one or more of reference signal received power (RSRP), reference signal received quality (RSRQ), channel quality indicator (CQI), channel state information (CSI) and signal to interference plus noise ratio (SINR), to determine whether to adjust radio resource management procedures such as, for example, setting the size of a measurement report, setting the value of measurement gap, determining a Time-to-Trigger value, and determining a signal hysteresis value, in the UE mobile device 120 by, for example, adjusting one or more of handover, uplink (UL) power control, radio link failure (RLF) recovery and link adaptation.

FIG. 10 is a diagram of a radio resource control (RRC) connection request message for use in a method for adjusting radio resource management procedures in a mobile device operating in a heterogeneous communication network, in accordance with exemplary embodiments of the present invention. The diagram 1000 illustrates the information elements that may be included in the radio resource control (RRC) connection request message 905 sent from the UE mobile device 120 to the serving eNB 115, as shown in the time sequence diagram 900 illustrated in FIG. 9.

In an exemplary embodiment, the radio resource control (RRC) connection request message may be in accordance with 3GPP TS 36.331, with an information element added to indicate a request for cell information, including, for example, information relating to one or more of cell size, cell type, system load, node information, maximum transmit power, maximum base station users, number of antennas and antenna gain. For example, a new information element CellCharacteristicsInfoRequest-IE, with a Boolean value, one bit information, indicating if the cell information is requested, may be added:

| RRCConnectionRequest message |
|---|
| ``` |
| -- ASN1START |
| RRCConnectionRequest ::=          SEQUENCE { |
|     criticalExtensions               CHOICE { |
|         rrcConnectionRequest-r8          RRCConnectionRequest-r8-IEs, |
|         criticalExtensionsFuture         SEQUENCE { } |
|     } |
| } |
| RRCConnectionRequest-r8-IEs ::=   SEQUENCE { |
|     ue-Identity                        InitialUE-Identity, |
|     establishmentCause                 EstablishmentCause, |
|     spare                              BIT STRING (SIZE (1)) |
| } |
| InitialUE-Identity ::=            CHOICE { |
|     s-TMSI                             S-TMSI, |
|     randomValue                           BIT STRING (SIZE (40)) |
| } |
| EstablishmentCause ::=            ENUMERATED { |
|                                       emergency, highPriorityAccess, mt-Access, mo-Signalling, |
|                                       mo-Data, delayTolerantAccess-v1020, spare2, spare1} |
| CellCharacteristicsInfoRequest-IE ::=        BOOLEAN |
| -- ASN1STOP |

Figure 11:
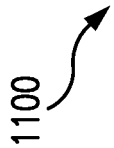
FIG. 11 is a diagram of information elements of a radio resource control (RRC) connection response message for use in a method for adjusting radio resource management procedures in a mobile device operating in a heterogeneous communication network, in accordance with exemplary embodiments of the present invention.

FIG. 11 is a diagram of a radio resource control (RRC) connection response message for use in a method for adjusting radio resource management procedures in a mobile device operating in a heterogeneous communication network, in accordance with exemplary embodiments of the present invention. The diagram 1100 illustrates the information elements that may be included in the radio resource control (RRC) connection response message 910 sent from the serving eNB 115 to the UE mobile device 120, as shown in the time sequence diagram 900 illustrated in FIG. 9.

In an exemplary embodiment, the radio resource control (RRC) connection response message may also be in accordance with 3GPP Specification 36.331, with an information element added to indicate a request for cell information, including, for example, information relating to one or more of cell size, cell type, system load, node information, maximum transmit power, maximum base station users, number of antennas and antenna gain. For example, the existing information element CellTypeIE defined in 3GPP TS 36.423 may be added:

| RRCConnectionSetup message |
|---|
| -- ASN1START |
| RRCConnectionSetup ::=            SEQUENCE { |
|     rrc-TransactionIdentifier          RRC-TransactionIdentifier, |
|     criticalExtensions                 CHOICE { |
|         c1                                 CHOICE { |
|             rrcConnectionSetup-r8              RRCConnectionSetup-r8-IEs, |

-continued

| RRCConnectionSetup message |
| --- |
|     spare7 NULL,<br>    spare6 NULL, spare5 NULL, spare4 NULL,<br>    spare3 NULL, spare2 NULL, spare1 NULL<br>  },<br>    criticalExtensionsFuture        SEQUENCE { }<br>  }<br>}<br>RRCConnectionSetup-r8-IEs ::=  SEQUENCE {<br>    radioResourceConfigDedicated    RadioResourceConfigDedicated,<br>    nonCriticalExtension            RRCConnectionSetup-v8a0-IEs          OPTIONAL<br>}<br>RRCConnectionSetup-v8a0-IEs ::= SEQUENCE {<br>    LateNonCriticalExtension        OCTET STRING          OPTIONAL,  -- Need OP<br>    nonCriticalExtension            SEQUENCE { }          OPTIONAL  -- Need OP<br>}<br>CellTypeIE<br>    -- ASN1STOP |

Specifically, 9.2.42 of 3GPP TS 36.423 provides the following enumerated cell sizes, which could be coded by bits, for example: '00'=verysmall, '01'=small, '10'=medium, and '11'=large:

9.2.42 Cell Type

The cell type protides the cell coverage area.

| IE/Group Name | Presence | Range | IE type and reference | Semantics description | Criticality | Assigned Criticality |
| --- | --- | --- | --- | --- | --- | --- |
| Cell Size | M | | ENUMERATED (verysmall, small, medium, large, . . . ) | | — | — |

Figure 12:
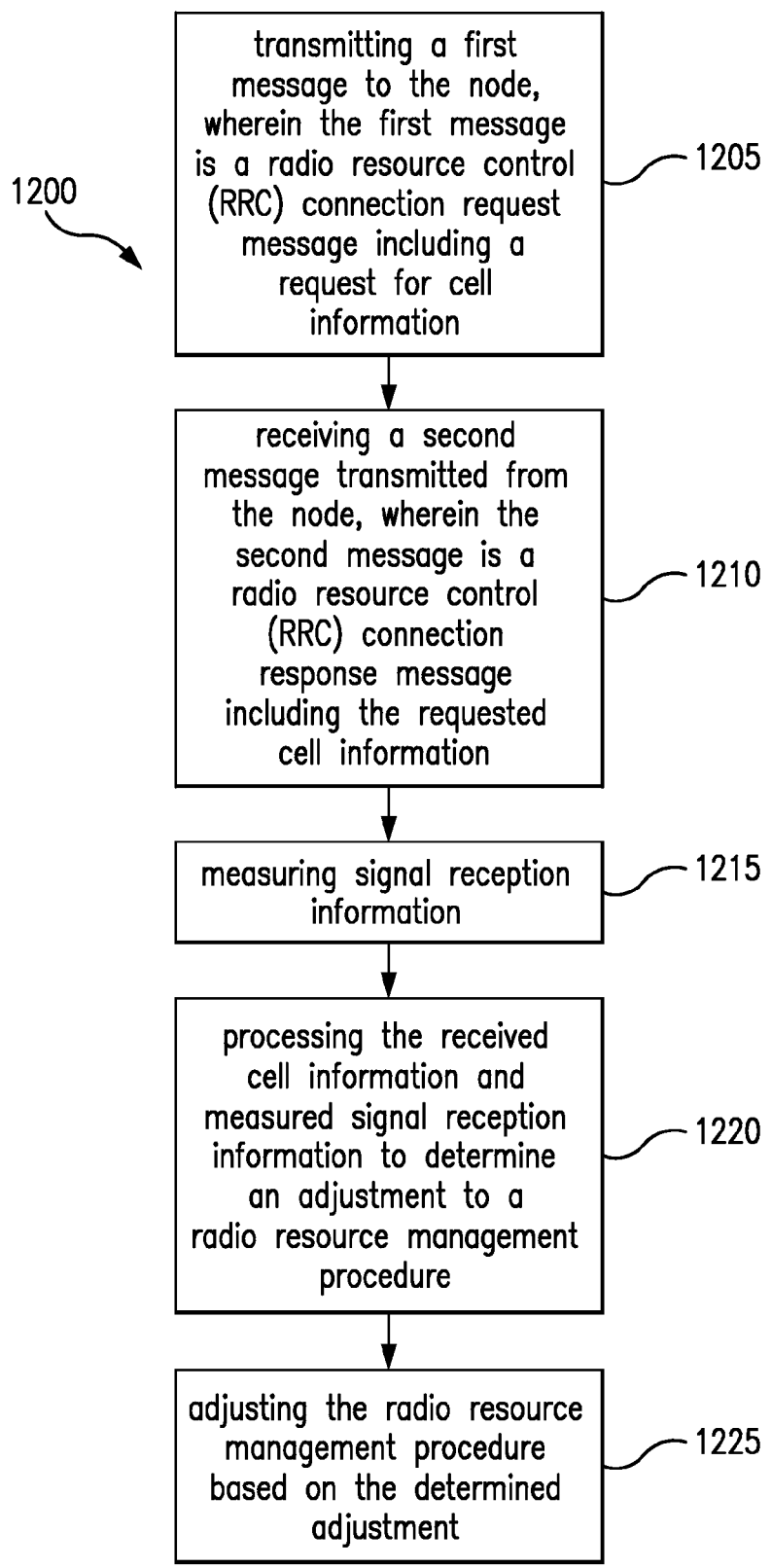
FIG. 12 is a flow chart illustrating the steps performed by a mobile device in a method for adjusting radio resource management procedures in a mobile device operating in a heterogeneous communication network using radio resource control (RRC) connection request and response messages, in accordance with exemplary embodiments of the present invention.
Figure 13:
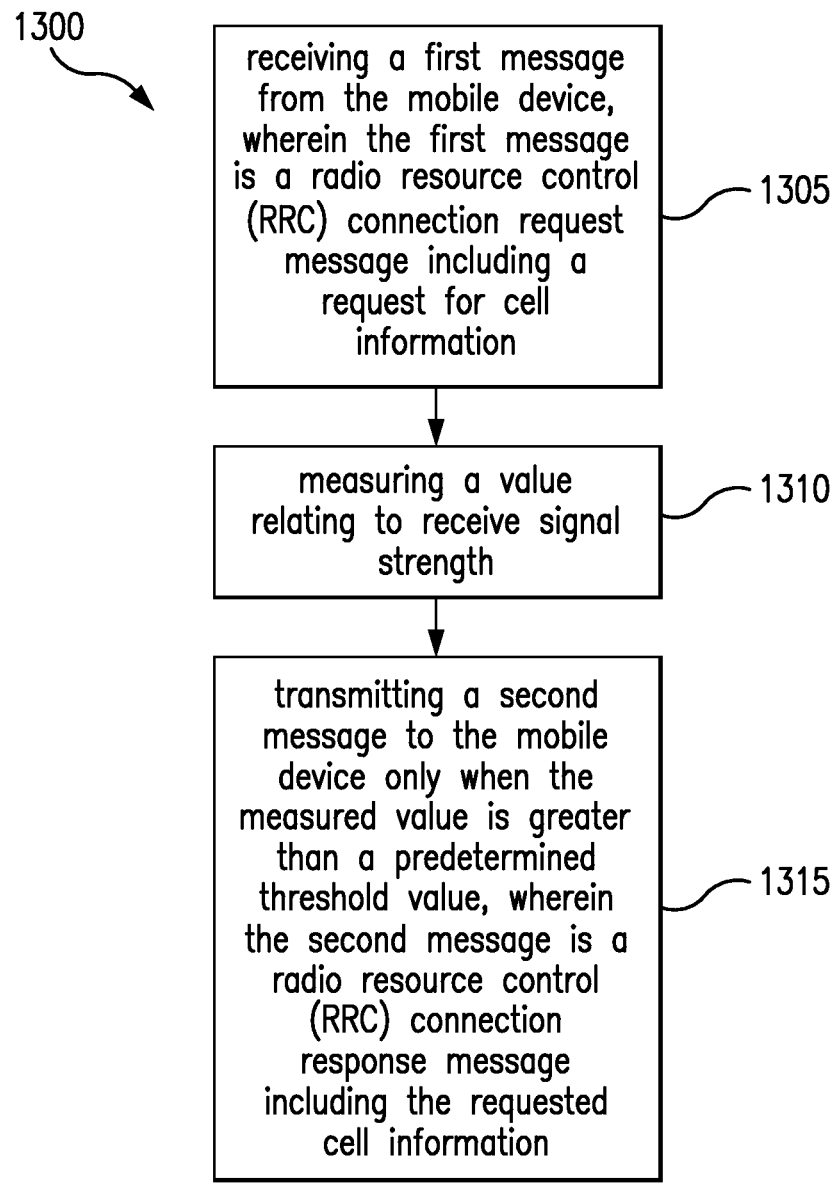
FIG. 13 is a flow chart illustrating the steps performed by a node in a method for adjusting radio resource management procedures in a mobile device operating in a heterogeneous communication network using radio resource control (RRC) connection request and response messages, in accordance with exemplary embodiments of the present invention.

Referring now to FIGS. 12 and 13, flow charts illustrating a method for adjusting radio resource management procedures in a mobile device operating in a heterogeneous communication network using radio resource control (RRC) connection request and response messages, in accordance with exemplary embodiments of the present invention, are provided. In the flow chart of FIG. 12, the steps are being performed by the UE mobile device 120. In the flow chart of FIG. 13, the steps are being performed by the serving eNB 115.

Referring first to FIG. 12, in the first step 1205, the UE mobile device 120 transmits a first message to the serving eNB 115. The first message may be a radio resource control (RRC) connection request message including a request for cell information. As described above, the cell information requested from the serving eNB 115 may include, for example, information relating to one or more of cell size, cell type, system load, node information, maximum transmit power, maximum base station users, number of antennas and antenna gain.

Referring now to FIG. 13, in the first step 1305, the serving eNB 115 receives the first message from the UE mobile device 120 requesting the cell information. In step 1310, the serving eNB 115 measures a value relating to received signal strength, and then, in step 1315, transmits a second message to the UE mobile device 120 only when the measured value is greater than a predetermined threshold value. The second message may be a radio resource control (RRC) connection response message that includes the requested cell information.

Referring now back to FIG. 12, in step 1210, the UE mobile device 120 receives the second message transmitted from the serving eNB 115, which includes the requested cell information. In step 1215, the UE mobile device 120 measures signal reception information. As discussed above, the signal reception information may include information relating to one or more of reference signal received power (RSRP), reference signal received quality (RSRQ), channel quality indicator (CQI), channel state information (CSI), and signal to interference plus noise ratio (SINR). In step 1220, the UE mobile device 120 processes the received cell information and measured signal reception information to determine an adjustment to a radio resource management procedure, and in step 1325, the UE mobile device 120 adjusts the radio resource management procedure based on the determined adjustment. As described above, adjusting the radio resource management procedure may include adjusting one or more of handover, uplink (UL) power control, radio link failure (RLF) recovery and link adaptation. Additionally, in certain of the embodiments in which the handover procedure is adjusted, the handover procedure adjustment includes one or more of setting the size of the measurement report, setting the value of measurement gap, determining a Time-to-Trigger value, and determining a signal hysteresis value.

Figure 14:
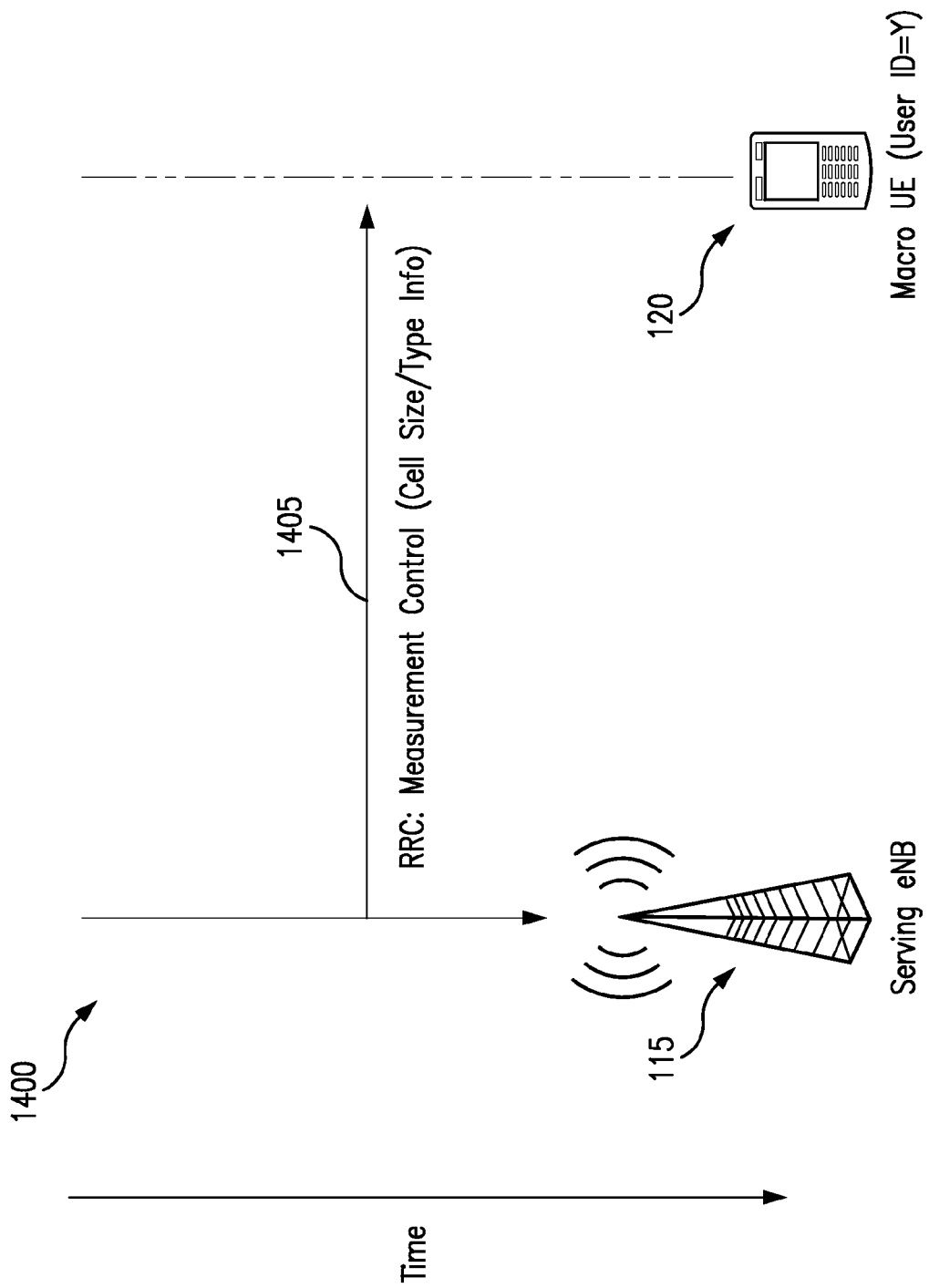
FIG. 14 is a time sequence diagram illustrating a third exemplary messaging flow for a method for adjusting radio resource management procedures in a mobile device operating in a heterogeneous communication network, in accordance with exemplary embodiments of the present invention.

Referring now to FIG. 14, a time sequence diagram 1400 illustrating a third exemplary messaging flow for a method for adjusting radio resource management procedures in a mobile device operating in a heterogeneous communication network, in accordance with exemplary embodiments of the present invention, is shown. In one embodiment, serving eNB 115 sends a radio resource control (RRC) message 1405 to UE mobile device 120 to enable the UE mobile device 120 to obtain cell information, including, for example, information relating to one or more of cell size, cell type, system load, node information, maximum transmit power, maximum base station users, number of antennas and antenna gain, from the serving eNB 115. This cell information is then utilized by the UE mobile device 120, along with signal reception information, including, for example, information relating to one or more of reference signal received power (RSRP), reference signal received quality (RSRQ), channel quality indicator (CQI), channel state information (CSI) and signal to interference plus noise ratio (SINR), to determine whether to adjust radio resource management procedures such as, for example, setting the size of a measurement report, setting the value of measurement gap, determining a Time-to-Trigger value, and determining a signal hysteresis value, in the UE mobile device 120 by, for example, adjusting one or more of handover, uplink (UL) power control, radio link failure (RLF) recovery and link adaptation.

Figure 15:
FIG. 15 is a diagram of information elements of a radio resource control (RRC) measurement control message for use in a method for adjusting radio resource management procedures in a mobile device operating in a heterogeneous communication network, in accordance with exemplary embodiments of the present invention.

FIG. 15 is a diagram of a radio resource control (RRC) measurement control message for use in a method for adjusting radio resource management procedures in a mobile device operating in a heterogeneous communication network, in accordance with exemplary embodiments of the present invention. The diagram 1500 illustrates the information elements that may be included in the radio resource control (RRC) measurement control message 1405 sent from the serving eNB 115 to the UE mobile device 120, as shown in the time sequence diagram 1400 illustrated in FIG. 14.

Figure 16:
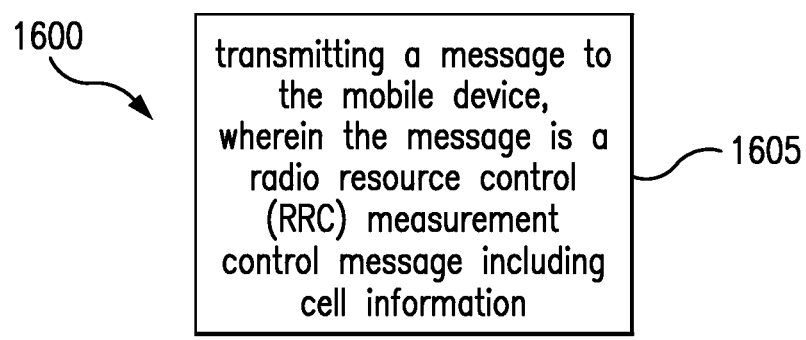
FIG. 16 is a flow chart illustrating the steps performed by a node in a method for adjusting radio resource management procedures in a mobile device operating in a heterogeneous communication network using a radio resource control (RRC) measurement control message, in accordance with exemplary embodiments of the present invention.
Figure 17:
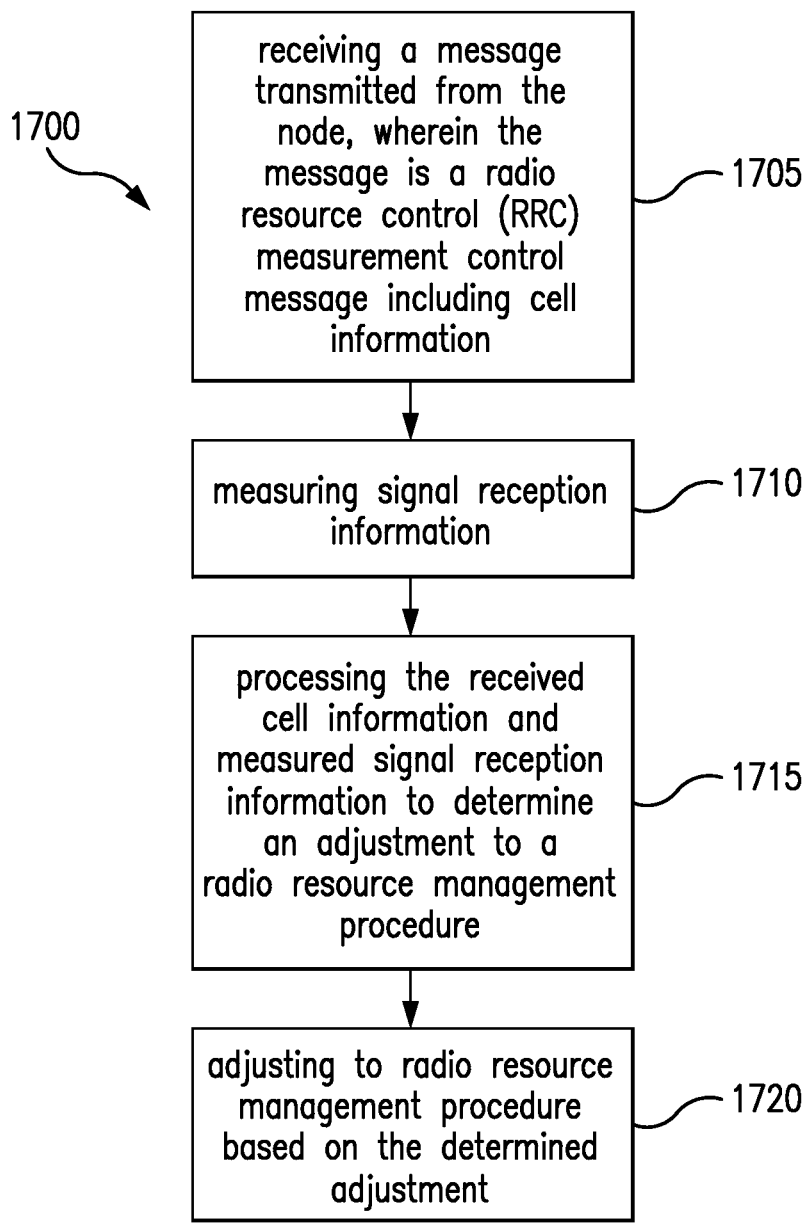
FIG. 17 is a flow chart illustrating the steps performed by a mobile device in a method for adjusting radio resource management procedures in a mobile device operating in a heterogeneous communication network using a radio resource control (RRC) measurement control message, in accordance with exemplary embodiments of the present invention.

Referring now to FIGS. 16 and 17, flow charts illustrating a method for adjusting radio resource management procedures in a mobile device operating in a heterogeneous communication network using a radio resource control (RRC) measurement control message, in accordance with exemplary embodiments of the present invention, are provided. In the flow chart of FIG. 16, the steps are being performed by the serving eNB 115. In the flow chart of FIG. 17, the steps are being performed by the UE mobile device 120.

Referring first to FIG. 16, in step 1605, the serving eNB 115 transmits a message to the UE mobile device 120. The message may be a radio resource control (RRC) measurement control message including cell information. As described above, the cell information transmitted from the serving eNB 115 may include, for example, information relating to one or more of cell size, cell type, system load, node information, maximum transmit power, maximum base station users, number of antennas and antenna gain.

Referring now to FIG. 17, in the first step 1705, the UE mobile device 120 receives the message transmitted from the serving eNB 115, which includes the requested cell information. In step 1710, the UE mobile device 120 measures signal reception information. As discussed above, the signal reception information may include information relating to one or more of reference signal received power (RSRP), reference signal received quality (RSRQ), channel quality indicator (CQI), channel state information (CSI), and signal to interference plus noise ratio (SINR). In step 1715, the UE mobile device 120 processes the received cell information and measured signal reception information to determine an adjustment to a radio resource management procedure, and in step 1720, the UE mobile device 120 adjusts the radio resource management procedure based on the determined adjustment. As described above, adjusting the radio resource management procedure may include adjusting one or more of handover, uplink (UL) power control, radio link failure (RLF) recovery and link adaptation. Additionally, in certain of the embodiments in which the handover procedure is adjusted, the handover procedure adjustment includes one or more of setting the size of the measurement report, setting the value of measurement gap, determining a Time-to-Trigger value, and determining a signal hysteresis value.

While various embodiments have been described above, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the methods described above and illustrated in the drawings are shown as a sequence of steps, this was done solely for the sake of illustration. Accordingly, it is contemplated that some steps may be added, some steps may be omitted, the order of steps may be re-arranged, and some steps may be performed in parallel.

What is claimed is:

1. A method for adjusting resource management procedures in a mobile device communicating with a node operating in a cell in a heterogeneous communication network, the method comprising:
   transmitting, by the mobile device, a first message to the node, the first message including a request for cell information;
   receiving, by the mobile device, a second message transmitted from the node, the second message including the requested cell information;
   measuring, by the mobile device, signal reception information;
   processing, by the mobile device, the received cell information and measured signal reception information to determine an adjustment to a resource management procedure; and
   adjusting, by the mobile device the resource management procedure based on the determined adjustment;
   wherein the cell information includes information relating to one or more of cell size, cell type, system load, node information, maximum transmit power, maximum base station users, number of antennas and antenna gain;
   wherein the resource management procedure is a radio resource management procedure and wherein adjusting the radio resource management procedure includes adjusting one or more of handover, uplink (UL) power control, radio link failure (RLF) recovery and link adaptation.

2. The method of claim 1, wherein the first message and the second message are radio resource control (RRC) messages.

3. The method of claim 1, wherein the first message is a radio resource control (RRC) connection request message and the second message is a radio resource control (RRC) connection response message.

4. The method of claim 1, wherein the signal reception information includes information relating to one or more of reference signal received power (RSRP), reference signal received quality (RSRQ), channel quality indicator (CQI), channel state information (CSI), and signal to interference plus noise ratio (SINR).

5. The method of claim 1, wherein adjusting handover includes one or more of setting the size of a measurement report, setting a value of a measurement gap, determining a Time-to-Trigger value, and determining a signal hysteresis value.

6. The method of claim 5, wherein the received cell information includes information relating to cell size and system load, the radio resource management procedure includes setting the size of a measurement report for transmission to the node, and wherein, based on the cell size and system load, the size of the measurement report is adjusted to a standard size or a minimum size.

7. The method of claim 1, further comprising measuring a value relating to a radio channel quality for transmitting to the node and transmitting the first message to the node only when the measured value is greater than a predetermined threshold value.

8. The method of claim 1, wherein the resource management procedure is a radio resource management procedure, wherein adjusting the radio resource management procedure includes adjusting handover based on the cell information, and wherein the cell information includes information relating to one or more of cell size, system load, or a maximum number of base station users.

9. A mobile device operable in a heterogeneous communication network to transmit messages to and receive messages from a node operating in a cell, comprising:
a processor;
a memory coupled to the processor; a transceiver coupled to the processor; and
an antenna coupled to the transceiver configured to transmit and receive messages;
wherein the processor is configured to:
transmit a first message to the node, the first message including a request for cell information;
receive a second message transmitted from the node, the second message including the requested cell information;
measure signal reception information;
process the received cell information and measured signal reception information to determine an adjustment to a resource management procedure; and
adjust the resource management procedure based on the determined adjustment;
wherein the cell information includes information relating to one or more of cell size, cell type, system load, node information, maximum transmit power, maximum base station users, number of antennas and antenna gain;
wherein the resource management procedure is a radio resource management procedure and wherein adjusting the radio resource management procedure includes adjusting one or more of handover, uplink (UL) power control, radio link failure (RLF) recovery and link adaptation.

10. The mobile device of claim 9, wherein the first message and the second message are radio resource control (RRC) messages.

11. The mobile device of claim 9, wherein the first message is a radio resource control (RRC) connection request message and the second message is a radio resource control (RRC) connection response message.

12. The mobile device of claim 9, wherein the signal reception information includes information relating to one or more of reference signal received power (RSRP), reference signal received quality (RSRQ), channel quality indicator (CQI), channel state information (CSI), and signal to interference plus noise ratio (SINR).

13. The mobile device of claim 9, wherein adjusting handover includes one or more of setting the size of a measurement report, setting a value of a measurement gap, determining a Time-to-Trigger value, and determining a signal hysteresis value.

14. The mobile device of claim 13, wherein the received cell information includes information relating to cell size and system load, the radio resource management procedure includes setting the size of a measurement report for transmission to the node, and wherein, based on the cell size and system load, the size of the measurement report is adjusted to a standard size or a minimum size.

15. The mobile device of claim 9, wherein the processor is further configured to measure a value relating to a radio channel quality for transmitting to the node and to transmit the first message to the node only when the measured value is greater than a predetermined threshold value.

16. A method for adjusting resource management procedures in a mobile device communicating with a node operating in a cell in a heterogeneous communication network, the method comprising:
receiving, by the mobile device, a message transmitted from the node, the message including cell information;
measuring, by the mobile device, signal reception information;
processing, by the mobile device, the received cell information and measured signal reception information to determine an adjustment to a resource management procedure; and
adjusting, by the mobile device the resource management procedure based on the determined adjustment;
wherein the cell information includes information relating to one or more of cell size, cell type, system load, node information, maximum transmit power, maximum base station users, number of antennas and antenna gain;
wherein the resource management procedure is a radio resource management procedure and wherein adjusting the radio resource management procedure includes adjusting one or more of handover, uplink (UL) power control, radio link failure (RLF) recovery and link adaptation.

17. The method of claim 16, wherein the message is a radio resource control (RRC) measurement control message.

18. The method of claim 16, wherein the signal reception information includes information relating to one or more of reference signal received power (RSRP), reference signal received quality (RSRQ), channel quality indicator (CQI), channel state information (CSI), and signal to interference plus noise ratio (SINR).

19. The method of claim 16, wherein adjusting handover includes one or more of setting the size of a measurement report, setting a value of a measurement gap, determining a Time-to-Trigger value, and determining a signal hysteresis value.

20. The method of claim 19, wherein the received cell information includes information relating to cell size and system load, the radio resource management procedure includes setting the size of a measurement report for transmission to the node, and wherein, based on the cell size and system load, the size of the measurement report is adjusted to a standard size or a minimum size.

21. A mobile device operable in a heterogeneous communication network to transmit messages to and receive messages from a node operating in a cell, comprising:
a processor;
a memory coupled to the processor;
a transceiver coupled to the processor; and
an antenna coupled to the transceiver configured to transmit and receive messages;
wherein the processor is configured to:
receive a message transmitted from the node, the message including cell information;
measure signal reception information;
process the received cell information and measured signal reception information to determine an adjustment to a resource management procedure; and
adjust the resource management procedure based on the determined adjustment;
wherein the cell information includes information relating to one or more of cell size, cell type, system load, node information, maximum transmit power, maximum base station users, number of antennas and antenna gain;
wherein the resource management procedure is a radio resource management procedure and wherein adjusting the radio resource management procedure includes adjusting one or more of handover, uplink (UL) power control, radio link failure (RLF) recovery and link adaptation.

22. The mobile device of claim 21, wherein the message is a radio resource control (RRC) measurement control message.

23. The mobile device of claim 21, wherein the signal reception information includes information relating to one or more of reference signal received power (RSRP), reference signal received quality (RSRQ), channel quality indicator (CQI), channel state information (CSI), and signal to interference plus noise ratio (SINR).

24. The mobile device of claim 21, wherein adjusting handover includes one or more of setting the size of a measurement report, setting a value of a measurement gap determining a Time-to-Trigger value, and determining a signal hysteresis value.

25. The mobile device of claim 24, wherein the received cell information includes information relating to cell size and system load, the radio resource management procedure includes setting the size of a measurement report for transmission to the node, and wherein, based on the cell size and system load, the size of the measurement report is adjusted to a standard size or a minimum size.

* * * * *